United States Patent
Zufall et al.

(10) Patent No.: US 11,108,479 B2
(45) Date of Patent: *Aug. 31, 2021

(54) MOBILE INTERACTIVE SATELLITE SERVICES

(71) Applicant: DBSD CORPORATION, Englewood, CO (US)

(72) Inventors: David Robert Zufall, Reston, VA (US); Gerard Daniel Mulford, North Potomac, MA (US); Stefan Bernard Raab, South Riding, VA (US); Mariam Aghdasi Sorond, Reston, VA (US); Marcus John Le Maitre, Leesburg, VA (US)

(73) Assignee: DBSD Corporation, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,870

(22) Filed: Mar. 2, 2019

(65) Prior Publication Data

US 2019/0245633 A1 Aug. 8, 2019

Related U.S. Application Data

(60) Continuation of application No. 15/055,856, filed on Feb. 29, 2016, now Pat. No. 10,270,550, which is a
(Continued)

(51) Int. Cl.
*H04H 20/22* (2008.01)
*H04W 76/15* (2018.01)
(Continued)

(52) U.S. Cl.
CPC .......... *H04H 20/22* (2013.01); *H04B 7/0408* (2013.01); *H04B 7/155* (2013.01);
(Continued)

(58) Field of Classification Search
CPC ........ H04H 20/16; H04H 20/18; H04H 20/20; H04H 20/22; H04H 20/24; H04H 20/26;
(Continued)

(56) References Cited

U.S. PATENT DOCUMENTS

| 4,992,947 A | 2/1991 | Nimura et al. |
| 5,394,561 A | 2/1995 | Freeburg |

(Continued)

FOREIGN PATENT DOCUMENTS

| EP | 1635482 A1 | 3/2006 |
| WO | 2007047370 A2 | 4/2007 |

OTHER PUBLICATIONS

U.S. Appl. No. 15/046,091, PTAB Decision, dated Dec. 12, 2019.
(Continued)

*Primary Examiner* — Yuwen Pan
*Assistant Examiner* — Paul P Tran
(74) *Attorney, Agent, or Firm* — Wash Park IP Ltd.; John T. Kennedy (57) ABSTRACT

A mobile interactive satellite service includes a first satellite, a base station, and a ground station configured to provide respective and distinct first and second multicast content components to the first satellite and the base station. The first satellite communicates the first multicast content component in a first signal to a mobile device. The base station communicates the second multicast content component in a second signal to the mobile device, which can combine the received signals. For another embodiment, a mobile interactive service includes a mobile device, a first base station, a second base station, and a ground station configured to provide a first multicast content component to the first base station and a second multicast content component to the second base station. The first and second multicast content components are distinct, transmitted in respective first and
(Continued)

second multicast signals and are combined by the mobile device.

5 Claims, 4 Drawing Sheets

Related U.S. Application Data division of application No. 11/797,048, filed on Apr. 30, 2007, now Pat. No. 9,276,664.

(51) Int. Cl.

| | |
|---|---|
| *H04B 7/185* | (2006.01) |
| *H04B 7/155* | (2006.01) |
| *H04W 88/06* | (2009.01) |
| *H04B 7/0408* | (2017.01) |
| *H04L 12/18* | (2006.01) |
| *H04W 84/12* | (2009.01) |
| H04L 29/06 | (2006.01) |
| H04W 16/28 | (2009.01) |
| H04B 7/19 | (2006.01) |
| H04B 7/195 | (2006.01) |
| H04W 88/08 | (2009.01) |

(52) U.S. Cl.
CPC ..... *H04B 7/18526* (2013.01); *H04B 7/18591* (2013.01); *H04L 12/18* (2013.01); *H04W 76/15* (2018.02); *H04W 84/12* (2013.01); *H04W 88/06* (2013.01); *H04B 7/18536* (2013.01); *H04B 7/18567* (2013.01); *H04B 7/19* (2013.01); *H04B 7/195* (2013.01); *H04L 65/4023* (2013.01); *H04W 16/28* (2013.01); *H04W 88/08* (2013.01)

(58) Field of Classification Search
CPC ........ H04H 20/28; H04H 20/63; H04H 20/74; H04H 40/90; H04H 60/13; H04H 60/43; H04H 60/80; H04H 2201/19; H04H 2201/20; H04B 7/022; H04B 7/024; H04B 7/026; H04B 7/12; H04B 7/0408; H04B 7/0671; H04B 7/155; H04B 7/18523; H04B 7/18526; H04B 7/18536; H04B 7/18567; H04B 7/18591; H04B 7/19; H04B 7/195; H04L 9/0827; H04L 12/18; H04L 65/4023; H04W 16/28; H04W 76/15; H04W 84/12; H04W 88/06; H04W 88/08
See application file for complete search history.

(56) References Cited

U.S. PATENT DOCUMENTS

| | | | |
|---|---|---|---|
| 5,758,261 A | 5/1998 | Wiedeman | |
| 5,919,246 A | 7/1999 | Waizmann et al. | |
| 6,212,473 B1 | 4/2001 | Stefan et al. | |
| 6,269,304 B1 | 7/2001 | Kaji et al. | |
| 6,360,167 B1 | 3/2002 | Millington et al. | |
| 6,377,981 B1 * | 4/2002 | Ollikainen | H04B 7/18578 709/217 |
| 6,405,129 B1 | 6/2002 | Yokota | |
| 6,484,094 B1 | 11/2002 | Wako | |
| 6,487,496 B2 | 11/2002 | Katayama et al. | |
| 6,505,118 B2 | 1/2003 | Chowanic et al. | |
| 6,522,865 B1 | 2/2003 | Otten | |
| 6,574,794 B1 * | 6/2003 | Sarraf | H04B 7/18515 725/63 |
| 6,711,474 B1 * | 3/2004 | Treyz | G01C 21/26 701/1 |
| 6,714,760 B2 | 3/2004 | Robinett | |
| 6,714,860 B1 | 3/2004 | Wawra et al. | |
| 6,741,834 B1 | 5/2004 | Godwin | |
| 6,771,742 B2 | 8/2004 | McCalmont et al. | |
| 6,816,778 B2 | 11/2004 | Diaz | |
| 6,865,149 B1 | 3/2005 | Kalman et al. | |
| 6,941,222 B2 | 9/2005 | Yano et al. | |
| 6,944,139 B1 | 9/2005 | Campanella | |
| 6,950,625 B2 | 9/2005 | Regulinksi et al. | |
| 6,961,658 B2 | 11/2005 | Ohler | |
| 6,992,991 B2 | 1/2006 | Duske et al. | |
| 6,999,720 B2 | 2/2006 | Karabinis | |
| 7,013,205 B1 | 3/2006 | Hafner et al. | |
| 7,017,175 B2 | 3/2006 | Alao et al. | |
| 7,031,702 B2 | 4/2006 | Karabinis et al. | |
| 7,042,858 B1 * | 5/2006 | Ma | H04L 1/0618 370/208 |
| 7,071,842 B1 | 7/2006 | Brady | |
| 7,082,365 B2 | 7/2006 | Sheha et al. | |
| 7,103,017 B2 | 9/2006 | Gutman et al. | |
| 7,136,661 B2 | 11/2006 | Graske et al. | |
| 7,164,661 B2 | 1/2007 | Kelly | |
| 7,174,127 B2 | 2/2007 | Otten et al. | |
| 7,176,813 B2 | 2/2007 | Kawamata et al. | |
| 7,194,270 B2 | 3/2007 | Smith | |
| 7,224,935 B2 | 5/2007 | Messina et al. | |
| 7,233,860 B2 | 6/2007 | Lokshin et al. | |
| 7,239,963 B2 | 7/2007 | Suzuki | |
| 7,242,948 B2 | 7/2007 | Fleischer et al. | |
| 7,269,503 B2 | 9/2007 | McGrath | |
| 7,271,742 B2 | 9/2007 | Sheha et al. | |
| 7,274,905 B1 | 9/2007 | Nguyen et al. | |
| 7,274,906 B1 | 9/2007 | Nguyen et al. | |
| 7,286,931 B2 | 10/2007 | Kawasaki | |
| 7,289,039 B2 | 10/2007 | Kato et al. | |
| 7,321,826 B2 | 1/2008 | Sheha | |
| 7,412,313 B2 | 8/2008 | Isaac | |
| 7,490,004 B2 | 2/2009 | Kimura | |
| 7,577,576 B2 | 8/2009 | Baechtiger | |
| 7,599,770 B2 | 10/2009 | Hardy | |
| 7,609,700 B1 | 10/2009 | Ying | |
| 7,610,151 B2 | 10/2009 | Letchner et al. | |
| 7,623,859 B2 | 11/2009 | Karabinis | |
| 7,634,224 B2 | 12/2009 | Nguyen et al. | |
| 7,756,465 B2 | 7/2010 | Nguyen | |
| 7,765,055 B2 | 7/2010 | Cera et al. | |
| 7,778,591 B1 | 8/2010 | Van Hoff | |
| 7,778,769 B2 | 8/2010 | Boss et al. | |
| 7,813,874 B2 | 10/2010 | Fujiwara | |
| 7,826,789 B2 | 11/2010 | Nord | |
| 7,908,076 B2 | 3/2011 | Downs et al. | |
| 8,060,389 B2 | 11/2011 | Johnson | |
| 8,099,086 B2 | 1/2012 | Singh et al. | |
| 9,939,286 B2 | 4/2018 | Raab | |
| 2002/0059400 A1 * | 5/2002 | Ikami | H04L 67/02 709/219 |
| 2002/0065078 A1 | 5/2002 | Cohen et al. | |
| 2002/0183059 A1 * | 12/2002 | Noreen | H04H 60/33 455/414.1 |
| 2002/0194598 A1 | 12/2002 | Connelly | |
| 2003/0063628 A1 | 4/2003 | Marko | |
| 2004/0022326 A1 | 2/2004 | Morrish | |
| 2004/0110467 A1 | 6/2004 | Wang | |
| 2004/0128682 A1 | 7/2004 | Liga | |
| 2004/0203919 A1 | 10/2004 | Ross | |
| 2004/0242152 A1 | 12/2004 | Jarett | |
| 2005/0055724 A1 | 3/2005 | Atad et al. | |
| 2005/0136832 A1 | 6/2005 | Spreizer | |
| 2005/0020737 A1 | 9/2005 | Schiff | |
| 2005/0239399 A1 | 10/2005 | Karabinis | |
| 2005/0239404 A1 | 10/2005 | Karabinis | |
| 2005/0276239 A1 | 12/2005 | Smallcomb | |
| 2006/0023656 A1 | 2/2006 | Anglin | |
| 2006/0160219 A1 | 7/2006 | Lee et al. | |
| 2006/0190981 A1 | 8/2006 | Weill et al. | |
| 2006/0217885 A1 | 9/2006 | Crady et al. | |
| 2006/0229810 A1 | 10/2006 | Cross et al. | |
| 2006/0253246 A1 | 11/2006 | Cera et al. | |
| 2006/0262724 A1 | 11/2006 | Friedman | |
| 2007/0058083 A1 | 3/2007 | Kim | |

(56) References Cited

U.S. PATENT DOCUMENTS

| | | |
|---|---|---|
| 2007/0077882 A1 | 4/2007 | Patsiokas |
| 2007/0086460 A1 | 4/2007 | Choi et al. |
| 2007/0087756 A1 | 4/2007 | Hoffberg |
| 2007/0124789 A1 | 5/2007 | Sachson et al. |
| 2007/0150174 A1 | 6/2007 | Seymour et al. |
| 2007/0182592 A1 | 8/2007 | Lekovic |
| 2007/0217588 A1* | 9/2007 | Bitterlich ............... G06F 9/461 379/201.03 |
| 2007/0288162 A1 | 12/2007 | Furukawa |
| 2008/0033639 A1 | 2/2008 | Nakamura et al. |
| 2008/0094250 A1 | 4/2008 | Myr |
| 2008/0134260 A1 | 6/2008 | Glassman et al. |
| 2008/0200114 A1 | 8/2008 | Eberlein et al. |
| 2008/0228562 A1 | 9/2008 | Smith |
| 2008/0242273 A1* | 10/2008 | Bhatia ................ H04L 12/1859 455/414.1 |
| 2008/0247444 A1 | 10/2008 | Dibiaso |
| 2008/0248815 A1 | 10/2008 | Busch |
| 2008/0268838 A1 | 10/2008 | Zufall et al. |
| 2008/0288406 A1 | 11/2008 | Seguin et al. |
| 2080/0319642 | 12/2008 | Debie |
| 2009/0007185 A1 | 1/2009 | Nix |
| 2009/0028318 A1 | 1/2009 | Bhogal |
| 2009/0118996 A1 | 5/2009 | Kantarjiev |
| 2009/0228196 A1 | 9/2009 | Raab |
| 2012/0065872 A1 | 3/2012 | Nortrup |
| 2012/0150425 A1 | 6/2012 | Chapman et al. |
| 2012/0205437 A1 | 8/2012 | Sauerwein et al. |
| 2012/0271541 A1 | 10/2012 | Hjelm et al. |
| 2013/0166208 A1 | 6/2013 | Forstall |

OTHER PUBLICATIONS

U.S. Appl. No. 15/046,091, Notice of Allowance, dated Feb. 19, 2020.
EP17155746.5, Response to Examination Report, dated May 28, 2019 (Received by WPIP on May 29, 2019).
EP171557481.1, Response to Exam Rpt, dated May 24, 2019.
EP1755749.9, Response to Exam Report, dated May 28, 2019 (Received by WPIP on May 28, 2019).
U.S. Appl. No. 15/055,856, Issue Notice, dated Apr. 3, 2019.
U.S. Appl. No. 15/055,874, Examiner's Answer, dated May 22, 2019.
U.S. Appl. No. 15/590,167, Notice of Allowability, dated Apr. 3, 2019.
U.S. Appl. No. 15/590,167, Issue Notice, dated Apr. 11, 2019.
U.S. Appl. No. 15/923,343, Non-final Office Action, dated Apr. 4, 2019.
U.S. Appl. No. 15/923,343, Response to Non-final Office Action, dated Jun. 19, 2019.
U.S. Appl. No. 15/055,874, Appeal Brief, dated Feb. 14, 2019, 30 pages.
EP17155746.5, Examination Report, dated Jan. 25, 2019.
EP171557481.1, Exam Rpt, dated Jan. 25, 2019.
EP1755749.9, Exam Report, dated Jan. 28, 2019.
U.S. Appl. No. 15/590,167, Notice of Allowability, dated Dec. 19, 2018.
U.S. Appl. No. 15/590,167, Notice of Allowability, dated Dec. 31, 2018.
U.S. Appl. No. 15/590,167, Notice of Allowability, dated Jan. 14, 2019.
U.S. Appl. No. 15/590,167, Notice of Allowability, dated Feb. 11, 2019.
U.S. Appl. No. 15/590,167, Notice of Allowability, dated Feb. 25, 2019.
U.S. Appl. No. 15/590,167, Notice of Allowability, dated Mar. 5, 2019.
U.S. Appl. No. 15/923,343, Final Office Action, dated Dec. 31, 2018.
U.S. Appl. No. 15/055,856, Notice of Allowability, dated Jan. 10, 2019.
U.S. Appl. No. 15/055,856, Notice of Allowability, dated Feb. 21, 2019.
U.S. Appl. No. 15/055,874, Reply Brief, dated Jul. 8, 2019.
U.S. Appl. No. 15/923,343, Notice of Allowance, dated Jul. 17, 2019.
U.S. Appl. No. 15/923,343, Issue Notice, dated Aug. 15, 2019.
U.S. Appl. No. 15/923,343, RCE, Amendment and Response, dated Mar. 11, 2019.
EP171557481.1, EP171557481.1, Summons to Oral Proceedings, dated May 18, 2020.
EP1755749.9, Summons to Oral Proceedings, dated May 20, 2020.
U.S. Appl. No. 15/046,091, Notice of Allowance, dated Apr. 6, 2020.
U.S. Appl. No. 15/046,091, Issue Notification, dated Apr. 30, 2020.
U.S. Appl. No. 15/055,874, Notice of Hearing, dated Jun. 29, 2020.
Segura, R., "COTS Satellite-Terrestrial Broadcast System for Deployed Communications, NATO Consultation, Command and Control Agency (NC3A), Communications and Information Systems Division", , p. 6.
U.S. Appl. No. 15/055,874, RCE and Amendment, dated Oct. 3, 2020.
U.S. Appl. No. 15/055,874, Examiner Amendment and Interview Summary, dated Nov. 6, 2020.
U.S. Appl. No. 15/055,874, Notice of Allowance & Examiner Interview Summary, dated Nov. 25, 2020.
EP17155746.5, Summons to Oral Proceedings, dated Jun. 26, 2020.
U.S. Appl. No. 15/055,874, Hearing Demonstratives, dated Jul. 22, 2020.
U.S. Appl. No. 15/055,874, PTAB Decision, dated Aug. 6, 2020.
U.S. Appl. No. 15/055,874, Hearing Transcript, dated Aug. 12, 2020.
U.S. Appl. No. 15/055,874, Notice of Allowability, dated Jan. 6, 2021.
U.S. Appl. No. 15/055,874, Issue Fee Payment, dated Feb. 19, 2021.
U.S. Appl. No. 15/055,874, Issue Notice, dated Mar. 25, 2021.
U.S. Appl. No. 17/179,894, filed Feb. 19, 2021.
U.S. Appl. No. 17/179,894, Notice of Missing Parts, dated Mar. 3, 2021.
EP171557481.1, Decision to Refuse, dated Apr. 21, 2021.
EP171557481.1, Minutes from Oral Proceedings, dated Apr. 22, 2021.

* cited by examiner

MOBILE INTERACTIVE SATELLITE SERVICES

CROSS REFERENCE TO RELATED APPLICATIONS

This application is a continuation of U.S. patent application Ser. No. 15/055,856, filed on Feb. 29, 2016, and entitled "Mobile Interactive Satellite Services" (the "'856 Application"), which is a divisional of U.S. patent application Ser. No. 11/797,048, filed on Apr. 30, 2007, now U.S. Pat. No. 9,276,664 and entitled "Mobile Interactive Satellite Service" (the "'048 Application"), the entirety of each of the '856 Application and the '048 Application are incorporated herein by reference.

TECHNICAL FIELD

Briefly, and in general terms, this disclosure relates to systems and methods for providing mobile interactive satellite services.

BACKGROUND

A variety of entities provide and are preparing to provide Mobile Satellite Service ("MSS"), communications services utilizing one or more satellites. One important limitation of MSS service has been an inability to achieve suburban or urban penetration. While 2 GHz MSS satellite communications provides effective coverage of rural and remote areas, coverage in suburban and urban areas is degraded by increased obscured satellite visibility.

Recognizing the value that the deployment and availability of MSS systems would bring by improving public safety, by providing voice, data, and messaging services to unserviced areas within the United States, and by increasing competition, the U.S. Federal Communications Commission ("FCC") issued orders permitting the use of an Ancillary Terrestrial Component ("ATC") to MSS systems to facilitate suburban and urban penetration.

MSS systems augmented with ATC ("MSS/ATC" systems) enable a wide variety of new communication services that will lead to the deployment and availability of commercially-viable interactive mobile satellite communications. By reusing at least a portion of frequencies between satellite and terrestrial communication systems, MSS/ATC systems offer more efficient spectrum utilization and effective coverage in both urban and rural areas. U.S. Pat. No. 6,950,625, which is hereby incorporated by reference in its entirety for all purposes, describes techniques for reusing frequencies between satellite and terrestrial systems. Additionally, U.S. Pat. No. 5,394,561 discloses a mechanism for networking satellite and terrestrial networks in which the power levels of the satellite and terrestrial communications are controlled so as to minimize co-channel interference.

Existing MSS and MSS/ATC systems typically provide satellite-based voice communications; however, it is possible, as described in this disclosure, to provide additional interactive communications. For example, U.S. Pat. No. 7,017,175 ("the '175 patent"), which is hereby incorporated by reference in its entirety for all purposes, describes techniques for providing interactive digital television. Using this interactive digital television system, viewers are provided with functionality not available in conventional television systems, such as, for example, the ability to receive targeted advertising, to request additional information related to a received multicast, to place an order for merchandise or services, to obtain information off of a network (e.g., the Internet), and the like.

There are many challenges in implementing an interactive communication system, such as that described by the '175 patent, in a hybrid satellite/terrestrial communication system. There is a need for an effective design to handle multicast transmissions across both satellite and ancillary terrestrial networks, as well as to handle interactive communications for individual users. Furthermore, network characteristics, such as latency, bandwidth, throughput, and the like, vary between satellite and terrestrial networks. Thus, there is a need for a hybrid communication system to effectively use both satellite and terrestrial networks to provide effective coverage to both urban and rural subscribers.

SUMMARY

In one general aspect, a system for providing mobile interactive satellite services includes a satellite operable to communicate with mobile units, a terrestrial base transceiver station operable to communicate with mobile units, and a ground station in communication with the satellite and the terrestrial base transceiver station to provide mobile interactive satellite services. The mobile interactive satellite services include a multicast component and an interactive component such that the ground station provides both the multicast component and the interactive component using the satellite, with the terrestrial base transceiver station used to provide an ancillary terrestrial component. The satellite may be placed in any orbit (e.g., a geostationary orbit, a low earth orbit, a medium earth orbit, a circular orbit, and the like) such that at least one satellite is operable to communicate with mobile units at a given time.

Furthermore, some implementations may provide multiple satellites, multiple terrestrial base transceiver stations, and/or multiple ground stations for various reasons, including, for example, redundancy, increased capacity, geographical coverage, reduced latency, improved performance, and the like. Additional satellites and/or terrestrial base transceiver stations may be used to transmit and/or receive information related to the multicast component and/or interactive component of the system.

In some implementations, multiple satellites are used. Additional satellites may be used to expand overall system capacity, to facilitate communication with terrestrial base transceiver stations, to expand service areas, etc. For example, in one implementation, the secondary satellite communicates information related to the multicast component of the mobile interactive satellite services between the terrestrial base transceiver station and the ground station.

The ground station may be implemented using a multicast core, an interactive core, and a communication unit coupled to the multicast core and the interactive core, such that the ground station may communicate with satellite to provide multicast and interactive communications to mobile units. The communication unit may be implemented using a radio-frequency communication unit to transmit and/or receive radio-frequency signals between the ground station and the satellite.

Some implementations use advanced antenna technology at the ground station and/or at the satellite to provide added benefits, such as increased capacity, reduced interference, increased link budget, beamforming, and the like. In one implementation, the communication unit includes a ground-based beamforming unit and a radio-frequency communication unit. The ground-based beamforming unit receives interactive and multicast communications information and performs digital signal processing. Then, the radio-frequency communications unit transmits one or more signals to the satellite such that the satellite may transmit the multicast and/or interactive information using beamforming. Any other advanced antenna technologies may be used, such as, for example, MIMO, various diversity techniques, beamforming, and the like.

Mobile interactive satellite services may include one or more of multicast audio, multicast video, multicast data, interactive audio, interactive video, interactive data, telephony, or the like.

In another general aspect, a device for communicating with a mobile interactive satellite service system includes an antenna, a transceiver coupled to the antenna and operable to communicate with a mobile interactive satellite service system, an input device, an output device, a processor unit (e.g., a general-purpose processor, an application-specific integrated circuit, a digital signal processor, and the like), and a network interface. The processor unit is coupled to the input device, the output device, and the transceiver such that the processor is operable to output received information from the transceiver using the output device, to receive interactive information from the input device, and to transmit data based on the received interactive information using the transceiver. The network interface is coupled to the processor such that the processor is operable to side load information.

The antenna may be implemented using any known antenna technology. For example, multiple elements may be used, such as in an antenna array, and digital signal processing techniques may be used to provide improved performance. The mobile interactive satellite service system may include both a terrestrial component and a satellite component. The same antenna(s) may be used for both components, or separate antennas may be employed. For example, it may be desirable to employ an omni-directional antenna for communication with terrestrial components while using a directional antenna for satellite communication. Alternatively, it may be desirable to use an antenna having at least two elements: a terrestrial element having linear polarization, and a satellite element having circular polarization.

The device may include any input and output devices. For example, the input device may be implemented using a mouse, a touch screen, a keyboard, a button, a microphone, a video camera, a joystick, a port, a remote control, and the like. The output device may be implemented using any display device (e.g., a cathode ray tube, a liquid crystal display panel, a projection screen, a plasma display, etc.), a speaker, a light, a port (e.g., a serial port, a network port, a date interface, etc.), and the like. The microphone may be used with a voice recognition unit to enable, for example, voice control, voice commands, and the like.

Some implementations include a side-loading network interface wherein the processor unit is coupled to the side-loading network interface such that the processor unit can receive information from the transceiver and from the side-loading network interface. The network interface may be implemented using any data networking technology including, for example, an IEEE 802.11 WiFi interface, an IEEE 802.16 WiMAX interface, a Bluetooth interface, an IEEE 802.20 interface, or the like.

Furthermore, a device for interacting with a mobile interactive satellite service system may be integrated with a vehicle (e.g., car, truck, bus, airplane, ship, and the like), by providing an interface to one or more vehicle subsystems as input and/or output devices. For example, the device may be integrated with a video entertainment system, an audio entertainment system, a navigation system, a vehicle data bus system, or the like. When a vehicle subsystem is provided as an output device, the device may be configured to receive information and use the received information to update one or more of the vehicle subsystems. One skilled in the art will understand that this configuration enables a wide-variety of applications. The device may be interfaced with a vehicle communication bus interface, such as, for example, CAN, OBDII, and/or MOST.

In another general aspect, a satellite for providing mobile interactive satellite services includes a ground station uplink that receives multicast content and interactive content from a ground station, mobile unit downlink that transmits multicast content and interactive content to mobile units, a mobile unit uplink that receives interactive content from the mobile units, a ground station downlink that transmits interactive content to the ground station, and a processor unit. The processing unit is coupled to the ground station uplink, the mobile unit downlink, the mobile unit uplink, and the ground station downlink, and configured to provide mobile interactive satellite services to the mobile units. In some implementations, the ground station uplink, the mobile unit downlink, the mobile unit uplink, and the ground station downlink operate in conjunction with an ancillary terrestrial communication system.

In this implementation, mobile interactive satellite services may include any interactive and/or multicast services, such as, for example, vehicle navigation, multicast video, interactive video, interactive data communication, vehicle telemetry, vehicle subsystem control, vehicle subsystem maintenance, vehicle security services, or the like. The satellite may use any advanced antenna technology, including beamforming.

In another general aspect, a ground station for providing mobile interactive satellite services includes a multicast core, an interactive core, and a radio frequency communication unit coupled to the multicast core and the interactive core such that the radio frequency communications unit is operable to communicate with the satellite to provide multicast and interactive communications to mobile units. The radio frequency communication unit may use any advanced antenna technology, such as, for example, beamforming or MIMO.

In another general aspect, a terrestrial base transceiver station for providing ancillary terrestrial communications in a mobile interactive satellite service includes a ground station communication link for communicating multicast and interactive content with a ground station, a mobile unit downlink that transmits multicast content and interactive content to mobile units, a mobile unit uplink that receives interactive content from the mobile units, and a processor unit. The processor unit is coupled to the ground station communication link, the mobile unit downlink, and the mobile unit uplink, and configured to provide ancillary terrestrial communications in a mobile interactive satellite service.

In another general aspect, a method for providing mobile interactive satellite services on a satellite includes receiving multicast data for transmission to mobile units, receiving interactive data for transmission to mobile units, and transmitting multicast data and interactive data to mobile units. Multicast data for transmission to mobile units may be received from any source, such as, for example, a ground station, a terrestrial base transceiver station, a satellite, or the like. Interactive data may be received from and/or transmitted to mobile units, ground stations, other satellites, or the like.

Data may be transmitted by a satellite and/or terrestrial base transceiver station using advanced antenna technology, such as, MIMO or beamforming. For example, advanced antenna technology can be used to form multiple beams configured to cover a geographical area.

In some implementations, transmitting multicast data and interactive data to mobile units includes transmitting multicast data over a first portion of available radio frequency spectrum, and transmitting interactive data over a second portion of available radio frequency spectrum. These portions of radio frequency spectrum may be configurable (either automatically, manually, and/or dynamically).

In another general aspect, a method for providing ground station support in a mobile interactive satellite service includes transmitting multicast data such that the multicast data may be communicated to mobile units, receiving interactive mobile unit data, processing the received interactive mobile unit data to determine interactive data to be communicated to at least one of the mobile units, and transmitting the determined interactive data such that the determined interactive data may be communicated to the at least one of the mobile units.

In some implementations, the method further includes receiving multicast data from a multicast data feed, such as, from a satellite feed, a terrestrial feed, or the like. Similarly, interactive mobile unit data may be received through a satellite, a terrestrial base transceiver station, or the like. This interactive mobile unit data may be obtained from a server, such as, for example, an application server, which may reside locally, on an internal communications network, and/or on an external communications network. Received interactive mobile unit data may be processed by retrieving data in response to the received interactive mobile unit data, and assembling the retrieved data for transmission. Once interactive data has been processed, the data may then be transmitted to one or more mobile units via satellite or terrestrial base transceiver station.

In another general aspect, a method for providing ancillary terrestrial communication in a mobile interactive satellite system includes augmenting a mobile interactive satellite system having a multicast component and an interactive component with a terrestrial base transceiver station, transmitting information for the multicast component and the interactive component using a satellite, and transmitting information for the multicast component and the interactive component using the terrestrial base transceiver station. The method may further include receiving information for the interactive component using the satellite and/or the terrestrial base transceiver station.

In another general aspect, a method for providing mobile interactive satellite services includes receiving multicast data for transmission using a communication system that includes a satellite with an ancillary terrestrial component, receiving interactive data using the communication system, determining interactive data for transmission using the received interactive data, and transmitting the multicast data and the determined interactive data using the communication system to provide mobile interactive satellite services. Multicast data may include, for example, broadcast video feeds, broadcast audio feeds, data feeds, or the like. Interactive data may be received from a mobile unit through a satellite and/or terrestrial communications link (e.g., through an ancillary terrestrial component of a mobile interactive satellite service). This terrestrial communications link may be implemented using a terrestrial base transceiver station. Multicast and/or interactive data may be transmitted using both a satellite and a ancillary terrestrial component. When interactive data is received from a mobile unit, the system determines a response, for example, by retrieving information based on the received interactive data.

Some implementations provide mobile interactive satellite services for vehicles, such as, for example, vehicle navigation, vehicle entertainment services, vehicle security services, and the like. By integrating a mobile unit with various vehicle subsystems, a mobile interactive satellite service system may be used to transmit information to update a variety of systems by providing software updates, configuration updates, firmware updates, and the like.

Vehicle security services may be provided to retrieve and provide vehicle security information, such as, for example, vehicle telemetry, vehicle location, vehicle security incidents, telephonic information, vehicle system information, and the like. Mobile interactive satellite services may provide vehicle-based services such as, remote vehicle tracking, remote vehicle disabling, remote vehicle enabling, remote vehicle unlocking, remote vehicle monitoring, vehicle black box access, vehicle black box recording, and the like.

In another general aspect, a method for interacting with a mobile interactive satellite service with an ancillary terrestrial component in a vehicle includes receiving information from a vehicle communication bus, and transmitting data to a mobile interactive satellite service system with an ancillary terrestrial component based on the received information. The vehicle communication bus may be used to obtain various notifications such as, for example, air bag deployment notification, vehicle speed information, vehicle position information, error messages, temperature indications, fuel level indications, and the like. The system may include receiving a request from the mobile interactive satellite system to perform an action on a vehicle system and perform the requested action.

In some implementations, the system receives notifications directly through a vehicle communication databus; however, in some implementations, the system periodically polls one or more vehicle systems (possibly using the vehicle communication database) to determine if an event has occurred. This system may be used to upgrade software, firmware, modify configurations, monitor systems, and the like, through a satellite-based communications system. This system may be used to retrieve and possibly output video, audio, data, and the like, using any output device, including a display, a speaker, a light, or the like.

The details of one or more implementations are set forth in the accompanying drawings and the description below. Other features and advantages will be apparent from the description and drawings, and from the claims.

DETAILED DESCRIPTION

Figure 1:
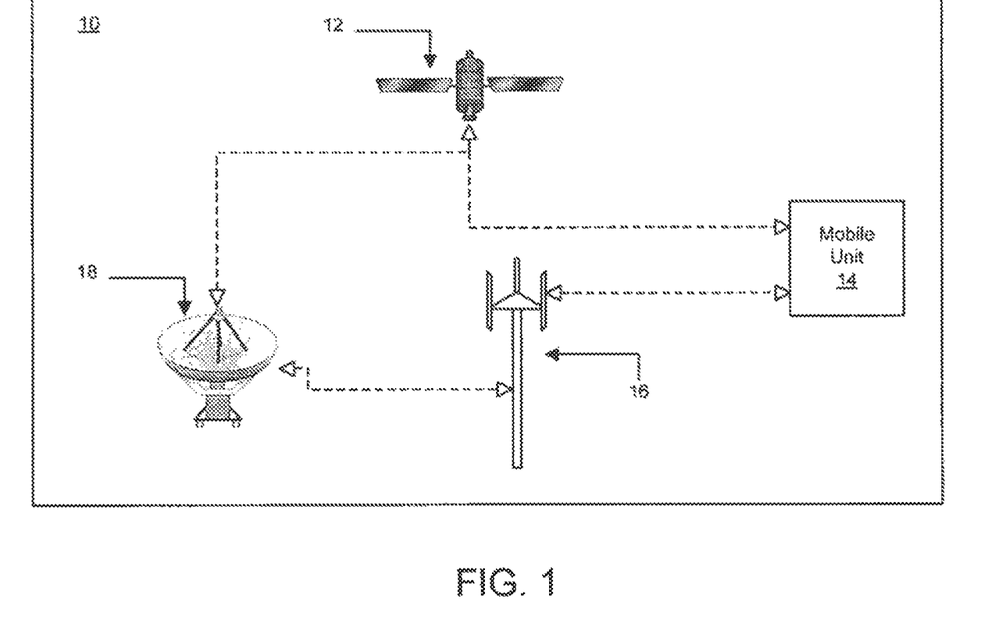
FIG. 1 is a diagram of a system for providing mobile interactive satellite services.

Referring to FIG. 1, a mobile interactive satellite services system 10 includes a satellite 12 to provide interactive communications with various mobile units 14. The mobile interactive satellite services ("MISS") system 10 includes an ancillary terrestrial component ("ATC") using one or more terrestrial base transceiver stations 16 to expand coverage and/or capacity of the satellite 12. A ground station 18 handles communications with the satellite 12 and with the terrestrial base transceiver stations 16 such that a mobile unit 14 may communicate with the satellite 12 and/or the terrestrial base transceiver stations 16.

The mobile interactive satellite services system 10 may be used to provide any interactive wireless communication services, such as, voice communications, broadcast video, on-demand video, broadcast audio, on-demand audio, broadcast data, on-demand data, interactive advertising services, public safety communications, mobile emergency communications, and the like.

In one embodiment, an advanced geostationary MISS satellite covering North America and its S-Band spectrum position, together with an ATC component may provide mobile interactive and mobile multicast communication services to mobile units 14. The space segment provides RF transport services between the ground stations 18 and the mobile units 14. In one embodiment, the space segment components may create from 1 to hundreds of spot beams with varying shape and gain across the United States and its territories. In the forward direction, it transmits digitized signals from the terrestrial network equipment. In the reverse direction, it receives signals from the mobile units 14 and passes these on to the ground station.

In one embodiment, the satellite operates in the 10+10 MHZ of the 20+20 MHz satellite S-band. The satellite forward link is between 2180 MHz and 2200 MHz, and the satellite reverse link is between 2000 and 2020 MHz. The technical regulations of the MSS/ATC spectrum are described by 47 CFR, part 25, herein incorporated by reference.

The satellite 12 may provide interactive and multicast capabilities to provide services. Communications between the satellite 12 and the mobile units 14 may be provided using any available communications technology including cellular-based technologies (e.g., CDMA 2000, CDMA EVDO, CDMA EVDO Platinum, DVB-H, WiMax, GSM, WCDMA, HSDPA, iDEN, FDMA, TDMA and the like); broadcast technologies (e.g., MediaFLO, DVB-H, DMB, Satellite Digital Radio, DAB, XM Radio, Sirius Radio, and the like); broadband technologies (e.g., WiMAX IEEE 802.16, WiFi IEEE 802.11, Flarion OFDM, IEEE 802.20, NexNet, Long Term Evolution, and the like); public safety communications technologies (e.g., P-25, iDEN, Tetra, and the like); and satellite communications technologies (e.g., GMR and variants, Inmarsat, S-UMTS, Qcom proprietary, DVB-S2, DVB-RCS, DVB-RCT, S-DMB, and the like).

The satellite and terrestrial network may be used to provide integrated applications combining streaming audio, video and other media content with interactive data services delivered to mobile units 14, such as vehicles and portable handheld devices. To provide interactive services both upstream and downstream communication links are provided to mobile units 14. In some implementations, the upstream and downstream communication links are implemented using the same technology. For example, using a two-way broadband networking technology, such as IEEE 802.20, data delivery and interactive services may both be provided using conventional IP networking. However, in some implementations, it is desirable to use a variety of communication techniques. For example, in an interactive multicast video system, it may be desirable to provide a multicast video downlink using multicast technologies, such as Digital Video Broadcasting ("DVB"), while using a broadband technology, such as IEEE 802.20, to provide interactivity and/or additional downlink services.

One skilled in the art will appreciate that any number of communication technologies may be used singly, or together in any combination in a MISS system 10 to provide mobile interactive satellite services. Various components of the MISS system 10 may be implemented using any existing or later developed communication technologies and protocols. For example, commercial off-the-shelf ('COTS') networking equipment could be used to implement communication links within the MISS system 10, such as, a COTS WiMAX system may be used for one or more of the satellite communication links. Furthermore, portions of a MISS system 10 may be implemented using third-party networks, such as, for example, broadcast feeds could be obtained from existing third-party networks, ancillary terrestrial coverage could be provided or could be augmented using existing third-party networks, etc. Additionally, a MISS system 10 may be configured to use multiple networking technologies over multiple bands.

The terrestrial network includes the radio access equipment at the satellite ground station 18, radio access equipment use in the terrestrial base transceiver stations ("BTS") 16, the core network and applications services infrastructure and the mobile units 14. The terrestrial base transceiver stations ("BTS") 16 provide terrestrial communications between the ground station 18 and mobile units 14. The mobile units 14 receive and demodulate signals and pass data to applications processors. In the reverse direction, applications processors in mobile units 14 pass data for transmission to the modems in the mobile units 14. The mobile units 14 send modulated waveforms up to the BTS 16, which in turn, forwards them to the ground stations 18. The mobile units 14 may be designed such that they can seamlessly communicate with the MISS system 10 in the same manner regardless of whether the communication is taking place with satellite 12 or with BTS 16. This facilitates communications transparency, if desired, for a particular implementation, in that the mobile units 14 may communicate with the MISS system 10 without knowing whether such communications is made through the satellite 12 or the BTS 16.

In some implementations, multicast signals are transmitted by both one or more satellites 12 and by multiple terrestrial BTS 16 stations. These transmissions may be made using the same frequencies, or different sets of frequencies may be used. When the mobile unit 14 transmits information, it may choose to transmit to a terrestrial network, to a satellite, or to attempt transmission to both. In this implementation, the mobile unit 14 determines the most appropriate network to use and transmits information using that network. For example, if a mobile unit 14 is in a suburban or an urban area with obstructed satellite visibility, the best network may be a terrestrial network. The mobile unit 14 would transmit information to that terrestrial network. The MISS system 10 may provide for handoff between two BTS stations 16, between two satellites 12, and/or between a satellite 12 and a BTS station 16. Any techniques for selecting networks and handing off between networks may be used.

Some implementations of the MISS system 10 maintain a location service such that the last known location of a particular mobile unit 14 is known. This may be used to enable unicast communication with a particular mobile unit 14. This may be used, for example, to terminate telephony communications at a particular mobile unit 14, to send a text message to a particular mobile unit 14, and/or to send interactive data.

Multicast signals may be received by a mobile unit 14 from various sources, such as, for example, from one or more satellite, from one or more terrestrial BTS, and through multiple antennas on or coupled to the mobile unit 14. Furthermore, multiple signals may be received from a single source (e.g., a device may transmit the same information at multiple frequencies, at different polarities, at different points in time, and/or using different transmission antennas or combinations of antennas). The mobile unit 14 may combine various received signals to increase reception performance. For example, one implementation of a mobile unit 14 is operable to combine up to four received signals. A mobile unit 14 may be implemented to combine any number of signals, or may be implemented without this functionality. These techniques may also be applied to interactive signals.

With respect to the terrestrial sites, there may be three different types of sites. Some may act as both multicast repeaters and two way base stations. Others may act only as multicast repeaters or only as two-way base stations. Combined repeaters and two way base stations may require two-way backhaul connections to the core network. The repeater component may be capable of receiving and demodulating the satellite signals and then transmitting it again to the mobile units 14. For cases where the repeater is unable to receive the S-Band signal, such as in the use of a single frequency network in which the satellite and terrestrial repeaters are transmitting identical signals on the same frequency, the content may be delivered via alternate, potentially leased, satellite links or via terrestrial backhaul. A terrestrial backhaul is any data network, such as, for example, the Internet, a local area network, a virtual private network, a wide area network, or the like.

The ground station 18 facilitates communications with the satellite 12 and the terrestrial BTS 16. Any communications technologies may be used between the satellite 12 and the ground station 18 to exchange information, such as, data to be transmitted by the satellite 12 to one or more mobile units 14; satellite telemetry, tracking, and control information; information received from one or more mobile units 14; and the like. Likewise, any communications technologies may be used between the ground station 18 and the BTS 16 to transmit similar information. In addition to wireless technologies, the communications link between the ground station 18 and the BTS 16 may be made using non-wireless alternatives, such as, copper cable, fiber optic cable, an Internet connection, a local area network, a wide area network, a virtual private network, and the like.

In one implementation, for interactive services, the mobile unit 14 always gives preference to the terrestrial network, if available, to ensure that the limited capacity of the satellite interactive link is reserved for users outside the coverage of the ATC network. The interactive core network has the capability to track the mobile units point of attachment to the network, either via satellite or terrestrial, allowing telephony or data sessions to be initiated from the core network to the mobile unit. Multicast services, which, in this implementation, are only delivered in the forward direction, can leverage advanced signal combining technologies to improve reception by evaluating both ATC and satellite signals simultaneously. Further, the system can leverage diversity antenna systems to provide increased signal gain by similarly combining multi-path signals.

Figure 2:
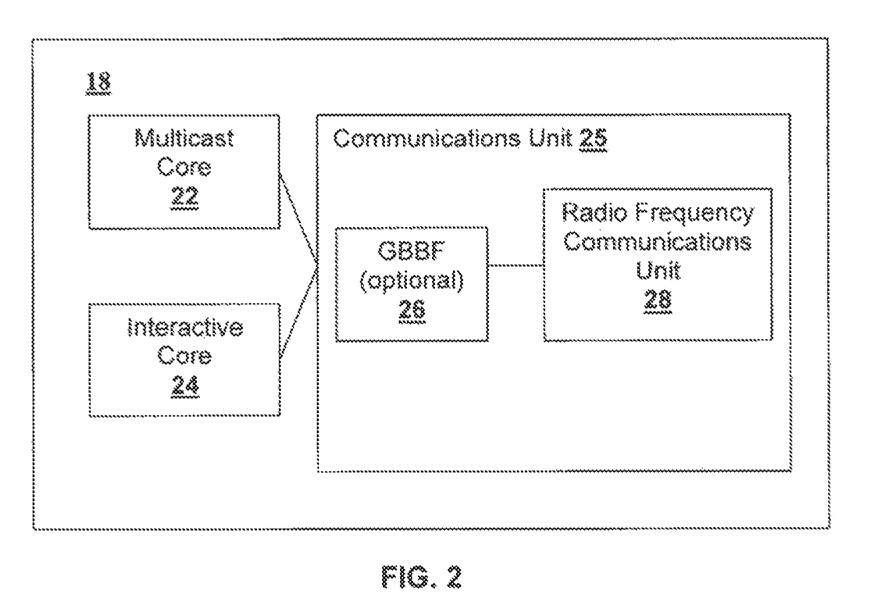
FIG. 2 is a diagram of a ground station for providing mobile interactive satellite services.

Referring to FIG. 2, one implementation of a ground station 18 includes a multicast core 22 that handles multicast-related communications, an interactive core 24 that handles interactive-related communications, a communication unit 25 that receives signals from the multicast core 22 and the interactive core 24 and facilitates transmission by the satellite 12. In some implementations, the communication unit 25 includes a ground-based beam-forming ("GBBF") unit 26 that performs digital signal processing on signals received from the multicast core 22 and the interactive core to facilitate multi-beam transmission by the satellite 12. The communication unit 25 also includes a radio-frequency communication unit 28 to enable radio-frequency communication with the satellite 12. Any advanced antenna technology may be used in place of, or in conjunction with the GBBF unit 26.

The multicast core 22 and the interactive core 24 may be connected via a data network to facilitate various interactions and coordination between the two cores. The ground station 18 also includes a telemetry, tracking and command ("TT&C") system. The output from the GBBF unit 26 is passed to the radio frequency communications unit 28 for transmission to the satellite 12. Using GBBF unit 26, the MISS system 10 can be configured for spectrum reuse. For example, regional beams may be used to transmit multicast information over a fairly wide area, while narrow spot beams are used for interactive services. Narrow spot beams allow frequency reuse, thus increasing capacity. Some implementations may use overlapping spot beams of various sizes.

Generally, the MISS system 10 may use any advanced antenna technology including ground-based or satellite-based beam-forming, MIMO, and the like. In one implementation, multiple feed horns are used. Radio signals are processed using a matrix multiplier (beam former) to calculate a signal for each feed horn such that the signals from each feed horn create interference patterns that effectively provide one or more focused beams of radio frequency energy. In this implementation, beams are defined statically through system configuration. One skilled in the art will appreciate that any advanced antenna technology may be used with a MISS system 10.

The MISS system 10 may be implemented without separating the functionality of the multicast core 22 and the interactive core 24 as shown in FIG. 2; however, for some implementations, the processing capabilities, requirements, and functionalities of the multicast core 22 and interactive core 24 will be sufficiently different that it will be desirable to separate the functionality as shown. The multicast core 22 handles information destined for a group of mobile units 14. For example, in an audio multicast implementation, the multicast core 22 would prepare audio information for multicast to groups of mobile units 14 based on, for example, subscriptions for those units. The interactive core 24, in contrast, handles interactivity, such as, requests for information, votes, messages, posts, and the like.

The terrestrial core system may include applications infrastructure, including servers and computers and telecommunications equipment and IP networking equipment. The terrestrial core system may be connected to the Internet via access servers. The terrestrial core network is responsible for end user applications and operations systems, such as provisioning, authentication and billing, and interconnect between operations centers and external networks, such as the Internet.

In one embodiment, a multicast link can be multicast using a single beam, while the interactive link is shown using multiple spot beams, 32, for example. The multicast link provides for content delivery throughout a broad coverage area. The spot beams minimize interference and support interactive two-way traffic. Such a system may support 1 Mbps interactive traffic and 5 Mbps multicast traffic. The satellite and terrestrial components can be deployed to share portions of the same spectrum, such as the terrestrial BTS 16 and satellite 12 shown in FIG. 1. The satellite and terrestrial segments may share portions of the frequency spectrum or be placed in separate bands.

Using the MISS system 10 as described above, a wide variety of interactive services may be supplied by a satellite-based system. Specific implementations are provided below for purposes of explanation; however, they are not intended to be limiting. One skilled in the art will understand and appreciate that many additional mobile interactive satellite services are within the scope of this disclosure.

Multicast Video Implementation

In one implementation of a mobile interactive satellite services system 10, multicast video is provided to mobile units 14 in conjunction with various interactive services. Similar to existing video distribution services (such as, cable television, broadcast television, IPTV, and the like), a MISS system 10 provides multiple channels of multicast video which are multicast to mobile units 14, such as handheld devices, computers, personal digital assistants, vehicles (e.g., cars, public transportation systems, airplanes, buses, and the like), televisions, Video iPods, a digital video recorder, and the like.

Figure 3:
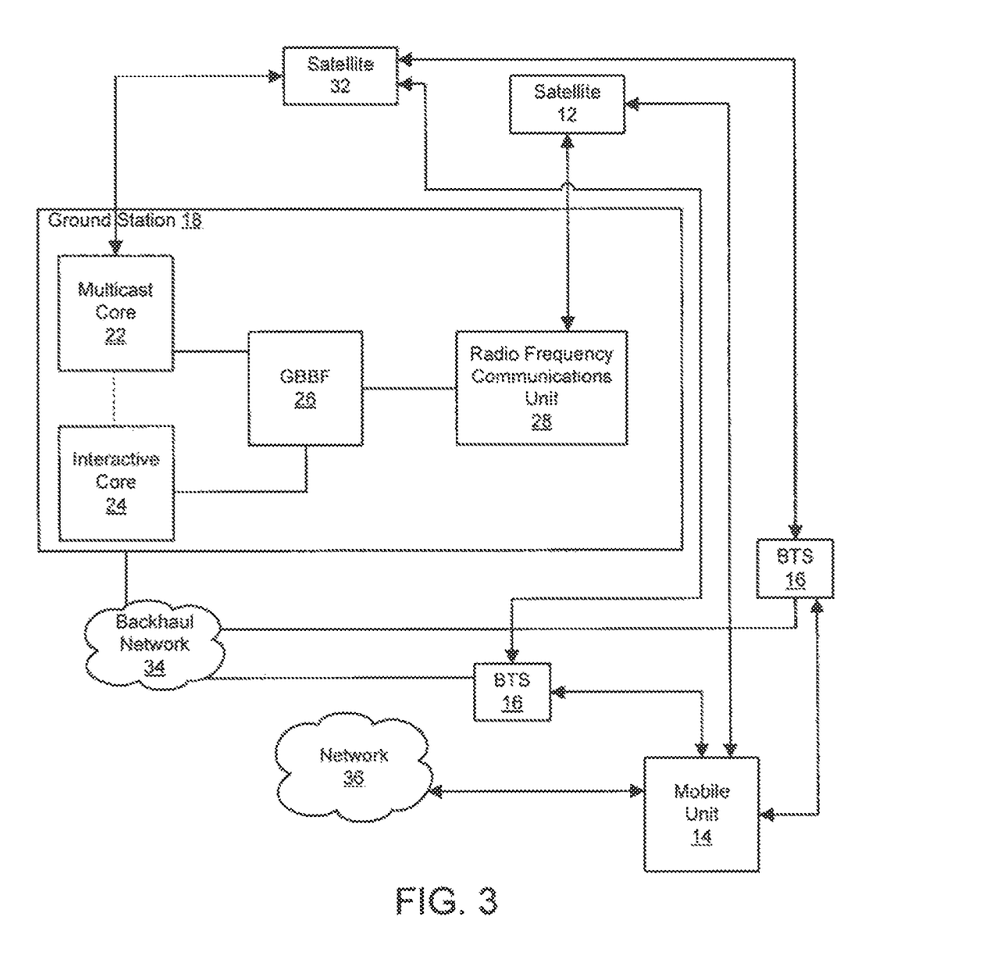
FIG. 3 is a diagram of a satellite-based mobile interactive multicast video system.

Referring to FIG. 3, a satellite 12 transmits multicast video for reception by mobile unit 14 using broadcast technology, such as, MediaFLO, DVB-H, DVB-SH, DVB-82, DMB, MPEG2, MPEG4, and the like. Video is channelized, typically by multiplexing IP Multicast streams, such that various programs are simultaneously transmitted. The mobile units 14 can be used to receive one or more programs for playback.

Figure 4:
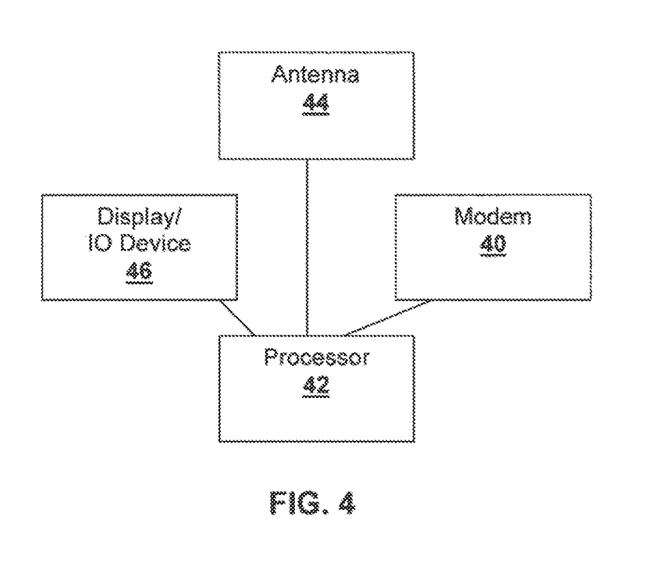
FIG. 4 is a block diagram of a mobile unit for use in a satellite-based mobile interactive multicast video system.

The mobile unit 14 may be implemented as a television-like device that receives a channel selected by a viewer and displays the video multicast on the selected channel to a viewer. The mobile unit 14 could be, for example, a conventional personal computer, a personal data assistant, wireless phone, mobile device, portable electronic game device, satellite set top box or electronic tablet or combinations of any of the above operably in communications with one another. The mobile unit 14 may be implemented with digital video recorder ("DVR") functionality. For example, a two-tuner DVR mobile unit 14 may be used to record programs. Using two tuners, two programs may be recorded simultaneously, or one program may be recorded while viewing a live multicast. In one embodiment, the mobile unit 14 is installed in a vehicle such as an automobile. As shown in FIG. 4, the mobile unit 14 has four major components: modem 40, processor 42, antenna 44 and display/IO device 46. The modem 40 performs the terrestrial and satellite radio functions. It receives and transmits radio signals via an antenna 44 and passes demodulated, decompressed, decoded applications programs and content to a processor 42. The processor 42, which includes storage and application processing capabilities, communicates by way of wired and wireless connection to display and input/output devices 46.

As mentioned above, the modem 40 may implement one or more air interfaces that support both terrestrial and satellite multicast and interactive functions. The modem 40 also may performs such functions as switch diversity, advanced combining techniques, and stream comparison between terrestrial and satellite radio paths. The modem 40 may contain transmit and receive amplifiers for communication with the satellite and terrestrial network via the antenna. The processor 42 may run standard operating systems such as Microsoft Windows, Linux, VxWorks, and the like. In one embodiment, the processor supports at least 16 Gbytes of storage and 1 Gbytes of RAM. Further, the processor may include flexible I/O interfaces including the ability to add other standard modems such as CDMA EVDO and HSDPA devices. It may be further capable of interfacing to wireless display, keyboard and remote control devices or via hardware connection to composite video and pin style audio interfaces.

Figure 5:
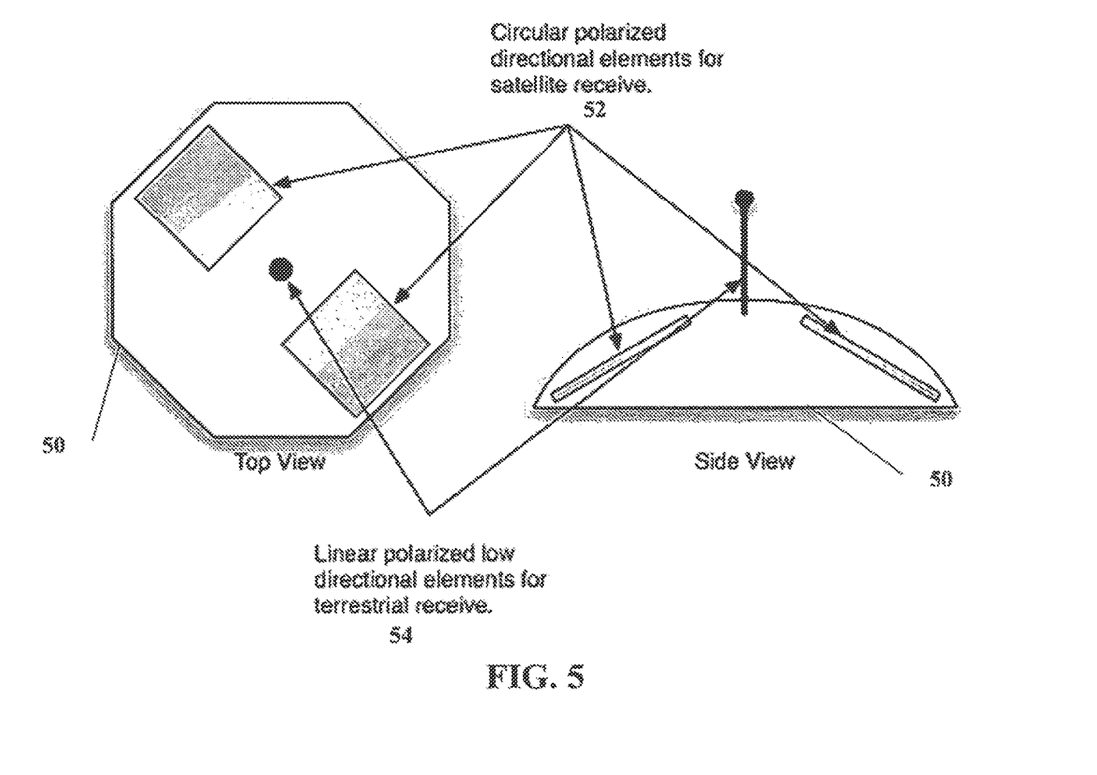
FIG. 5 is a diagram of a mobile antenna for use with a satellite-based mobile interactive multicast video system.

Referring to FIG. 5, a multi-element antenna 50 may be used having one element 54 that is linearly polarized for communication with terrestrial base transceiver stations, and a second element 52 that is circularly polarized for communication with one or more satellites. In this manner, antenna 50 provides improved performance for both terrestrial and satellite communications.

When the mobile unit 14 is in a vehicle, the processor may be capable of being mounted in a vehicle trunk with wired connections to the antenna and a power system and wireless or wired connections to the display device.

The display of the mobile unit 14 may be a conventional display and other I/O devices which can communicate by way of wireless or hardware composite video connection to the processor. In the vehicle embodiment, the display may be implemented, for example, using a panel of at least 7 inches in diagonal with a 16:9 aspect ratio and 853 by 480 pixel resolution. However, other display characteristics and features are also covered.

Other implementations of the device include, but are not limited to, portable media players with integrated or external modems and/or antenna, mobile telephones, portable electronic game devices, and ultra mobile PCs.

In this multicast video implementation, a ground station 18 includes a multicast core 22 which receives broadcast video content from, for example, local sources (e.g., DVDs, tapes, CDs, digital storage media, and the like), video feeds (e.g., satellite feeds, point-to-point links, computer network feeds, and the like), etc. The multicast core 22 then forwards assembled and transcoded content to the GBBF 26 for processing. The ancillary terrestrial component would not require the same beam-forming processing. Accordingly, in this implementation, information is also forwarded to satellite 32 for transmission to terrestrial base transceiver stations 16.

Consider, for example, a video multicast system that provides content that varies between three geographical regions. The content for each of the three regions is sent to the GBBF 26 to perform digital processing such that the satellite 12 can transmit the data in three regional conus beams. However, transmissions from a terrestrial BTS 16 are typically local in extent, therefore each BTS 16 resides in a single region. Accordingly, each BTS 16 receives multicast information for a single region and processing by the GBBF 26 is not necessary. In this implementation, information destined for a BTS 16 is sent through satellite 32. In additional implementations, this information may be sent across one or more terrestrial-based networks or through the satellite 12.

In some implementations, each BTS 16 or groups of BTS 16 in a MISS system 10 may transmit differing content.

In addition, the ground station 18 includes an interactive core 24 coupled to a backhaul network 34. The backhaul network 34 is used to transmit interactive data between a BTS 16 and the interactive core 24. Interactive communication between a mobile unit 14 and the ground station 18 may go through satellite 12 or through a BTS 16.

Interactivity for multicast services may be delivered to the mobile unit 14 in a number of different ways. For example, multiple video programs can be compressed into MPEG2 or MPEG4 streams, for example, and multicast to the mobile units with data commands. At certain points during the video, a switch can be made to another video stream with different content. Such applications such as interactive video advertising can make use of multiplexed related digital video streams.

Carouselling is a well known technique for delivering interactive programs to receiver devices, such as mobile unit 14. With carouselling, compressed video signals, audio signals and interactive program modules, including interactive software and/or data, are packetized and time division multiplexed at the interactive core 24 for transmission. These programs can be repetitively transmitted so that a mobile unit 14 can download the program at any time and store them in memory. Such programs can be controlled at the mobile unit 14 upon receipt of special signal commands in the multicast. The mobile unit 14 can monitor the multicast stream for special commands. Upon receipt of commands, the mobile unit 14 can effectuate any state change in the program including starting execution of the interactive program, suspend execution, halt execution, or other states.

User applications may include general purpose and interactive applications. General purpose applications may include video encoding management, digital rights management, subscriber management, voice, messaging, geo-location, m-commerce, provisioning, authentication, authorization, billing, network management, and the like. Further, applications may also support specific end-user services. The satellite and terrestrial component subsystems may operate interconnect in a public or private IP-based network.

A variety of interactive services may be included, such as, any of the following services set forth below, or the like. Media and extended media applications may be included such as real time video or other media sent from satellite and terrestrial repeaters and interactive applications which complement media services. Mobile service applications may be included such as (1) GPS driving directions with integrated traffic data, and (2), restaurant, shopping, entertainment and other services with integrated location and messaging. Communications and safety services may also be provided including the following: (1) emergency communications with public safety agencies; (2) telematics and other vehicle data ranging from theft notification and response to maintenance interactions with support systems; (3) person to person messaging; (4) voice and emergency voice communications; and (5) telephony (e.g., voice communications through the PSTN, and/or the Internet). Additionally, the mobile units 14 may include applications that allow for transmitting or receiving content and data from other mobile devices or home networking devices via WiFi or other network interfaces. Mobile units 14 may also include applications allowing high speed Internet access with streaming services and integration with cellular service via common IP core networks.

Signals from the interactive core and the multicast core may be used to provide a seamless interactive service. When data from the interactive core and the multicast core are used together, it may be desirable to provide some mechanism to coordinate the data. For example, when a user is viewing multicast video programming that includes an interactive voting or polling element, the system may need some coordination such that the interactive aspects of voting are displayed at the appropriate times. There are many techniques that would be known to one skilled in the art. For example, the multicast signal may be augmented with queues that indicated when to insert or active interactive components. This coordination and integration between multicast and interactive components will vary depending on the particular data being delivered. One skilled in the art will understand how to effectively coordinate the multicast and interactive components.

Sample applications may include interactive voting. The mobile unit 14 includes one or more user input devices to allow a viewer to vote. This may be used, for example, to poll the audience as used by popular programs, such as American Idol; however, in an interactive multicast video system, this may be performed in real-time.

Second, interactive services may be used to allow a viewer to request additional information regarding a television show, a featured product, an advertisement, or the like.

Third, interactive services may be used to allow a user to request information unrelated to the current multicast, such as, the current weather, traffic conditions, upcoming programs, stock quotes and other information services, e-mail, messages, voicemail, or the like.

Fourth, interactive services may be used to allow a viewer to send requests to online information sources. For example, a viewer may use interactive services to request universal resource locators ("URLs") across the Internet through a web browser.

Fifth, interactive services may be used to augment multicasts with information for a particular user or for a particular region. For example, the satellite 12 or the BTS 16 may send users public safety-related messages for their area. In the case of an amber alert, hurricane, earthquake, civil unrest, war, etc., the satellite 12 can steer a spot beam to an affected area (using the GBBF 26). The spot beam can then multicast information related to the event to viewers in the affected area. Similarly, the interactive core 24 can send information through the backhaul network 34 to each BTS 16 in the affected area so that the BTS 16 can send analogous public safety information.

Sixth, interactive services may be used to allow a viewer to purchase a product, service, information access, or the like.

Furthermore, implementations may use location awareness at the mobile unit 14 to vary service offering. For example, location awareness may be used to filter information and present only that information which meets certain criteria, such as a defined geographical coverage area, proximity to a particular geolocation, etc. Location awareness may be used to limit or customize service based on a mobile unit's 14 location. Location awareness allows services to be varied based on geographical areas. This allows regional blackouts or targeting services to a limited geographical area. This ability may be used, for example, to comply with contractual obligations (e.g., sports blackouts, licensing limitations, etc.), to comply with legal or regulatory restrictions (e.g., preventing unlicensed multicasts), to target or customize services for a particular geographical area, and the like.

One skilled in the art will understand that any interactive communications services (such as, any Internet service, any interactive data service, any interactive voice service, any interactive video service, or the like) could be used with the MISS system 10.

Interactive multicast video services may be provided using, for example, the techniques described in U.S. Pat. No. 7,017,175, which is hereby incorporated by reference in its entirety for all purposes. In this implementation, mobile units 14 communicate with application servers using light versions of conventional Internet protocols. For example, a light hypertext transport protocol ("HTTP") and/or a user datagram protocol ("UDP"). These allow interactive communication between one or more application servers and mobile units 14. Implementations may provide "push" technology whereby targeted content may be pushed to a mobile unit 14. This would allow, for example, the display of targeted advertising. Additionally, using HTTP, a light version of the HTTP protocol, UDP, or the like, a mobile unit 14 can receive information, request information, submit information, etc.

In some implementations, the mobile unit 14 may be configured to perform side loading. Side loading is the ability to load content or information for use by the mobile unit 14 through some mechanism other than satellite 12 or BTS 16.

In this implementation, side loading is enabled using network 36, which may be implemented using any communications technology. Furthermore, a mobile unit 14 may include the ability to side load from more than one such network 36. By augmenting mobile unit 14 with a network interface device, such as, a WiFi IEEE 802.11 interface, a WiMAX IEEE 802.16 interface, a GSM interface, a CDMA EVDO interface, or the like, the mobile unit 14 may connect to one or more networks 36 to download additional content. Side loading may be used, for example, for background downloading of content. For example, in one implementation, a vehicle-mounted device uses a WiFi link to a user's home Internet connection to download content from servers in the core network while the vehicle is parked in a garage (or otherwise in range of the WiFi network). In this manner, the user may have fresh content loaded into a device, ready for playback when they drive away in the morning.

A wide variety of information may transmitted to mobile units 14 using side loading including those set forth below, and the like. Side loading may be configured to automatically download content selected by a service provider, to download user-selected content, content based on collected user preferences, and/or the like.

First, advertisements may be loaded onto mobile units 14 such that targeted advertising may be displayed during video multicast, between video multicasts, or during the display of any information. Advertising may be targeted using such information as, the viewer's profile, the location of the mobile unit 14, the program currently being viewed, and the like. For example, if a viewer is watching a children's television program, age-appropriate advertisements may be displayed. If the mobile unit 14 is nearing a rest stop, an advertisement for services provided by the rest stop may be displayed.

Second, recorded video programs may be loaded onto mobile units 14. For example, a vehicle entertainment system mobile unit 14 with a WiFi interface can connect to a local area network in a home and download information across a home network, such as, recorded programs from a digital video recorder; recorded programs from a computer; recorded programs retrieved across the Internet; music or other audio programming available from DVRs, computers, or other devices; or the like. Side loading may be performed using existing protocols (such as, for example, UPNP) or through proprietary protocols.

Third, system updates may be loaded onto mobile units 14 using side loading. This would allow software upgrades, system maintenance, etc., to take place across a network other than a satellite-based MISS system 10. Furthermore, side-loading may be used to update additional systems, such as, a navigation system, a vehicle computer system, a vehicle entertainment system, or the like.

Mobile interactive satellite services may be augmented using information obtained through side-loading. For example, information obtained by side-loading may include targeted advertisements such that a mobile unit 14 may insert a targeted advertisement during playback of a multicasted signal.

Side-loading may also be used to provide DVR-like functionality. For example, a mobile unit 14 in an automobile is typically only driven for a short portion of the day. It is likely that a subscriber would desire to watch programming that is shown at another time of the day than that when the mobile unit 14 is being used. Thus, some DVR-like functionality is desirable. One solution would be to simply record shows when they are multicasted and store them such that they may be viewed when desired. Another solution is to download shows (either through an on-demand-like system, or from a PVR-like device where the shows have been recorded) through side-loading.

Interactive Mobile Assistance

Some implementations of the MISS system 10 provide interactive mobile assistance (e.g., travel assistance, emergency assistance, and the like) to users of mobile units 14, either in addition to the multicast video services described above, with other services, or as a standalone service.

For example, using the interactive core 24, a MISS system 10 can provide voice services to mobile units 14. This would allow telephonic communications, emergency communications (e.g., 911 calls, calls for tow trucks, vehicle tracking, vehicle disabling, vehicle locking/unlocking, and the like), or requests for information (e.g., calls to a concierge, calls for travel directions, calls for restaurant recommendations, calls for hotel reservations and recommendations, and the like). Simultaneous with the voice communications, data can be transmitted to the receiving party including, but not limited to location, vehicle diagnostics, images, and/or video. Mobile Assistance services may also be provided using text message or automated telemetry. For example, one system may send an emergency distress message including location information and a still image from an in-car camera when a vehicle's air bag(s) are deployed.

In some implementations of a Mobile Assistance system, a mobile unit 14 uses the MISS system 10 upon the occurrence of predefined triggers. For example, predefined triggers may include various vehicle databus events, such as, for example, airbag deployment, fuel warnings (e.g., low gas, out of gas), errors, engine malfunction codes, and the like.

In some implementations the mobile unit 14 is designed such that the radio unit can be removed from the vehicle and operated in a standalone mode. For example, if a user were to drive off the road in a remote area outside satellite coverage, they could remove a device from the car and carry it to an area in satellite coverage. When the mobile unit 14 is operated from vehicle power and includes various inputs and outputs to devices and/or subsystems within the vehicle, the functionality of the mobile unit 14 may be limited when operating in standalone mode. For example, in some implementations, the mobile unit 14 operating in standalone mode may be used to initiate an emergency distress call using a very limited subset of features in the device.

Additionally, the Mobile Assistance system may be used to provide services similar to LoJack or Mobile Guardian. The mobile unit 14 may communicate with a MISS system 10 to track a vehicle, to help recover vehicle, to remotely enable/disable a vehicle, to remotely unlock a vehicle, and the like.

Mobile Interactive Media Implementation

One implementation of a mobile interactive satellite system 10 provides three main services to vehicles: (1) video delivery; (2) navigation; and (3) vehicle safety services. Previous attempts to provide mobile video have struggled to reduce device sizes, extend battery life, and improve coverage sufficiently to provide a commercially viable service. Providing mobile video to vehicles overcomes problems of device size and battery life. Additionally, the mobile interactive satellite system 10, such as that described above, provides improved coverage through the use of an ancillary terrestrial component.

This implementation provides satellite video delivery, terrestrial video delivery, as well as the side-loading of additional content. By providing terrestrial video delivery and side-loading, the system provides DVR functionality to time-shift content, thus giving subscribers video content that they want. In this manner, subscribers are not limited to simply watching available satellite video broadcasts and more content may be made available to subscribers than would be available in a multicast-only system.

Conventional navigation systems provide static data that may be updated periodically, for example, by purchasing annual DVD or CD updates. However, Internet users have become less tolerant of stale, static data. Using a mobile interactive satellite service 10, a navigation system can be provided having two-way interactivity. This will allow, not only, the availability of real-time navigation data, but also new services allowing collaboration on the creation of micro-niche data sets. From street food vendors to clean bathrooms, real-time geo-localized datasets may be provided to consumers using this implementation of a mobile interactive satellite service 10.

One skilled in the art will appreciate how the two-way interactivity of this system can be used to provide a wide variety of interactive navigation systems. In addition to collaboration, navigation may be targeted based on user preferences, profiles, or tastes, and navigation may be modified in real-time based on weather, traffic, warnings from other users, or the like. Many additional interactive navigation systems will be apparent to one skilled in the art.

Finally, this implementation provides vehicle safety services. For example, the mobile interactive satellite system 10 may be used to provide services like those provided by conventional vehicle safety systems, such as, OnStar. However, using two-way interactivity, this implementation provides many additional features. For example, the system is operable to send notifications of dangerous conditions.

Consider, for example, a weather emergency such as a hurricane. The MISS system 10 may be used to communicate emergency information, such as, for example, text messages, satellite images, video footage, traffic information, and the like. This information may be multicast over the entire service area of the MISS system 10, over one or more predefined beams, or a spot beam can be specially configured to cover an affected geographical region. Additionally, interactive information services may be provided as described above, for example, emergency responders and/or the public may use the MISS system 10 to provide interactive communications and services. By integrating this functionality with its navigation components, this system can assist subscribers in avoiding dangers.

Figure 6:
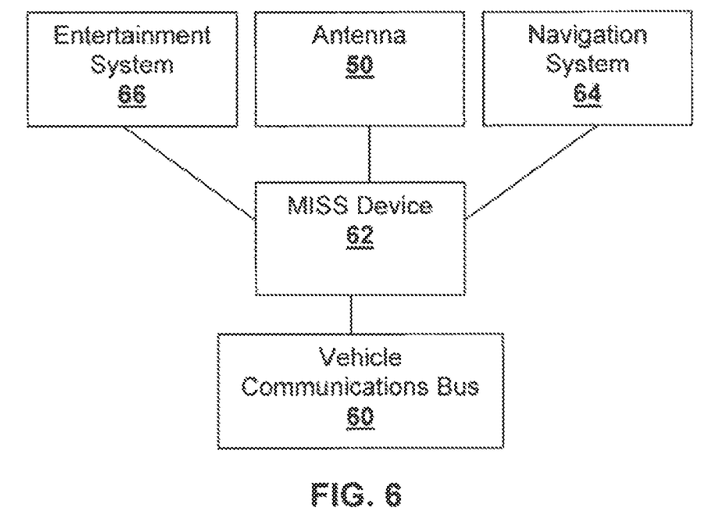
FIG. 6 is a block diagram of a mobile interactive media system.

Referring to FIG. 6, in some implementations, a vehicle communication bus 60 is integrated with a MISS device 62. The MISS device 62 is coupled to an antenna 50, a navigation system 64, and an entertainment system 66. The vehicle communication bus 60 may be implemented using any protocol or technique, such as, for example, CAN, ODBII, MOST, or the like.

Portable Interactive Video Implementation

One implementation of a MISS system 10 provides interactive multicast video services to portable handheld devices. A mobile unit 14 is configured with a display screen such that the mobile unit 14 may receive multicast audio and/or video from a satellite 12 or from a terrestrial BTS 16. For example, using the mobile unit 14, a subscriber may choose between a number multicast video programs.

Some implementations of a portable interactive video system may provide the ability to side-load content and/or data (e.g., using a USB port, a data network, or the like). The mobile unit 14 provides various interactive services such as those described above. Additionally, the mobile unit 14 may be configured to provide telephony services and/or emergency voice communications services. Furthermore, some implementations of the mobile unit 14 provide security services such as, for example, location reporting, tracking, theft recovery, or the like.

A number of implementations have been described. Nevertheless, it will be understood that various modifications may be made without departing from the spirit and scope of the invention. Accordingly, other implementations are within the scope of the following claims.

What is claimed is:

1. A mobile interactive service, comprising:
   a mobile device;
   a first base station;
   a second base station;
   a ground station configured to provide a first multicast content component to the first base station and a second multicast content component to the second base station;
   wherein the first base station is operable to transmit the first multicast content component to the mobile device in a first multicast signal;
   wherein the second base station is operable to transmit the second multicast content component to the mobile device in a second multicast signal;
   wherein the first multicast content component is distinct from the second multicast content component; and
   wherein the mobile device is configured to combine the first multicast content component and the second multicast content component.

2. The mobile interactive service of claim 1, further comprising:
   a satellite;
   wherein the satellite is operable to communicate one of the first multicast content component and the second multicast content component to the mobile device in a third signal; and
   wherein the mobile device is operable to combine the third signal with one of the first multicast signal and the second multicast signal.

3. The mobile interactive service of claim 2,
   wherein at least one of the satellite, the first base station and the second base station are operable to communicate with the mobile device using an interactive communications link.

4. The mobile interactive service of claim 3,
wherein the mobile device is operable to communicate with another mobile unit using a non-mobile interactive satellite services communications component.

5. The mobile interactive service of claim 4,
wherein the non-mobile interactive satellite services communications component uses at least one of a cellular-based technology, a broadband technology, a public safety communications technology, and a satellite communications technology.

\* \* \* \* \*